(12) United States Patent
Hammond et al.

(10) Patent No.: US 11,652,930 B2
(45) Date of Patent: May 16, 2023

(54) SYSTEMS AND METHODS FOR SYNCHRONIZING DOCUMENT EDITS USING APPLICATION STATE VARIABLES

(71) Applicant: CIMPRESS SCHWEIZ GMBH, Winterthur (CH)

(72) Inventors: Edward James Hammond, Waltham, MA (US); Christina Kayastha, Cambridge, MA (US); Gal Rakhsha-Shenar, Needham, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 0 days.

(21) Appl. No.: 16/525,879

(22) Filed: Jul. 30, 2019

(65) Prior Publication Data

US 2021/0037146 A1    Feb. 4, 2021

(51) Int. Cl.
*H04N 1/00*   (2006.01)
*G06Q 10/10*   (2012.01)

(52) U.S. Cl.
CPC ..... *H04N 1/00167* (2013.01); *H04N 1/00145* (2013.01); *H04N 1/00156* (2013.01); *H04N 1/00185* (2013.01)

(58) Field of Classification Search
CPC .......... H04N 1/00167; H04N 1/00145; H04N 1/00156; H04N 1/00185; H04N 1/00132; H04N 1/00153; H04N 1/00161; H04N 1/00183; G06F 3/1272; G06F 3/1256; G06F 3/04812; G06F 17/2288; G06F 17/24;

(Continued)

(56) References Cited

U.S. PATENT DOCUMENTS 9,430,454 B2 *   8/2016   Newman ............... G06F 40/197
2010/0174783 A1 *   7/2010   Zarom ................... H04L 65/403
                                                                    709/205

(Continued)

OTHER PUBLICATIONS

Ionescu et al., A chat-centric collaborative environment for web-based real-time collaboration, 2015 IEEE 10th Jubilee International Symposium on Applied Computational Intelligence and Informatics, pp. 105-110 (May 2015).

(Continued)

*Primary Examiner* — Chad Dickerson
(74) *Attorney, Agent, or Firm* — Marshall, Gerstein & Borun LLP

(57) ABSTRACT

Systems and methods of co-editing a design for a printed product is disclosed. According to certain aspects, a server may store tool state variable(s) corresponding to editing tool(s) included in a printed product editor in a database; receive, from a first electronic device executing a first instantiation of the printed product editor, a request for a collaborative communication session with a second electronic device executing a second instantiation of the printed product editor; generate the collaborative communication session between the two devices in response to the request, the collaborative communication session including a state of editing tool(s) of the first instantiation of the printed product editor; update the tool state variable(s) corresponding to the state of editing tool(s) of the first instantiation in the database; and synchronize a state of editing tool(s) of the second instantiation in response to the updating.

18 Claims, 12 Drawing Sheets

(58) Field of Classification Search
CPC .... G06F 17/241; G06F 40/166; G06F 40/169; G06F 40/197; G06Q 10/101; H04L 67/10; H04L 67/42
USPC .................. 358/1.11–1.18; 709/205; 715/756
See application file for complete search history.

(56) References Cited

U.S. PATENT DOCUMENTS

| | | | |
|---|---|---|---|
| 2011/0252304 A1* | 10/2011 | Lemonik | G06F 40/14 |
| | | | 715/234 |
| 2011/0252339 A1* | 10/2011 | Lemonik | H04L 67/01 |
| | | | 715/753 |
| 2012/0331402 A1* | 12/2012 | Hon | G06F 16/44 |
| | | | 715/756 |
| 2015/0082196 A1* | 3/2015 | Berger | G06F 3/0484 |
| | | | 715/753 |
| 2015/0261411 A1* | 9/2015 | Snook | G06F 3/04817 |
| | | | 715/751 |
| 2017/0220546 A1* | 8/2017 | Codrington | G06F 16/2282 |
| 2018/0219923 A1 | 8/2018 | Berger et al. | |
| 2020/0162561 A1* | 5/2020 | Milvaney | G06F 9/542 |

OTHER PUBLICATIONS

International Application No. PCT/IB2020/057168, International Search Report and Written Opinion, dated Sep. 14, 2020.

\* cited by examiner

SYSTEMS AND METHODS FOR SYNCHRONIZING DOCUMENT EDITS USING APPLICATION STATE VARIABLES

FIELD

The present disclosure is directed to improvements in product design using electronic devices. More particularly, the present disclosure is directed to platforms and technologies associated with assisted editing of product designs.

BACKGROUND

The design and fulfillment of printed products is available on-line from a variety of vendors. For instance, a wide variety of printed products including embroidery and promotional products are available online from a variety of vendors. On several of the printed product vendor websites, a customer may have access to an online design studio which enables the online design of a printed product either from scratch, from an upload or from a variety of available templates. For example, the VISTAPRINT.COM website allows a user to access the site and use tools and templates supplied by Vistaprint® to select, design and purchase personalized products for business use such as business cards, postcards, brochures and letterhead, and for personal use, such as invitations, announcements and thank you cards.

Over the years, online design studios have become more comprehensive and therefore in some cases more complicated to learn and use. One method of help that a customer may elect is to call customer service of the printed product vendor. A customer care agent can then talk the customer through the problems they may be having. A drawback of this method is that the customer care agent face difficulties in conveying instructions related to tools usage to the customer without a visual aid, especially for online design studios that offer numerous tools to the customer. Alternatively, a customer can share their screen with a customer service agent who can assist the customer via remote control of that customer's desktop. However, this sharing method will show everything that occurs on the customer's screen outside of the customer's editing session, whether initiated by the customer or the service agent. Sharing the customer's screen outside of the customer's editing session raises privacy concerns, especially if the customer does not desire to share content in a portion of the screen.

As such, conventional ways of assisted editing of product designs do not provide finer control mechanisms constrained to the customer's editing session or online design studio being used by the customer. Particularly, existing assistance techniques are not well suited to conveying instructions related to tools usage to the customer.

Accordingly, there is an opportunity for platforms and techniques to remedy these deficiencies.

SUMMARY

In an embodiment, a computer-implemented method of co-editing a design for a printed product is provided. The method may include: storing, by one or more processors, one or more tool state variables corresponding to editing tools included in a printed product editor in a database; receiving, by the one or more processors and from a first electronic device executing a first instantiation of the printed product editor, a request for a collaborative communication session with a second electronic device executing a second instantiation of the printed product editor; generating, by the one or more processors, the collaborative communication session between the first electronic device and the second electronic device in response to the request, the collaborative communication session including a state of editing tools of the first instantiation of the printed product editor; updating, by the one or more processors, the one or more tool state variables corresponding to the state of editing tools of the first instantiation of the printed product editor in the database; and synchronizing, by the one or more processors, a state of editing tools of the second instantiation of the printed product editor in response to the updating.

In another embodiment, a server for co-editing a design for a printed product is provided. The server may include a memory storing non-transitory computer executable instructions; and a computer processor interfacing with the user interface and the memory, wherein the computer processor is configured to execute the non-transitory computer executable instructions to: store one or more tool state variables corresponding to editing tools included in a printed product editor in a database; receive, from a first electronic device executing a first instantiation of the printed product editor, a request for a collaborative communication session with a second electronic device executing a second instantiation of the printed product editor; generate the collaborative communication session between the first electronic device and the second electronic device in response to the request, the collaborative communication session including a state of editing tools of the first instantiation of the printed product editor; update the one or more tool state variables corresponding to the state of editing tools of the first instantiation of the printed product editor in the database; and synchronize a state of editing tools of the second instantiation of the printed product editor in response to the updating.

In a further embodiment, a non-transitory computer-readable storage medium configured to store instructions is provided. The instructions when executed by a processor may cause the processor to perform operations comprising: storing one or more tool state variables corresponding to editing tools included in a printed product editor in a database; receiving, from a first electronic device executing a first instantiation of the printed product editor, a request for a collaborative communication session with a second electronic device executing a second instantiation of the printed product editor; generating the collaborative communication session between the first electronic device and the second electronic device in response to the request, the collaborative communication session including a state of editing tools of the first instantiation of the printed product editor; updating the one or more tool state variables corresponding to the state of editing tools of the first instantiation of the printed product editor in the database; and synchronizing a state of editing tools of the second instantiation of the printed product editor in response to the updating.

DETAILED DESCRIPTION

Figure 1:
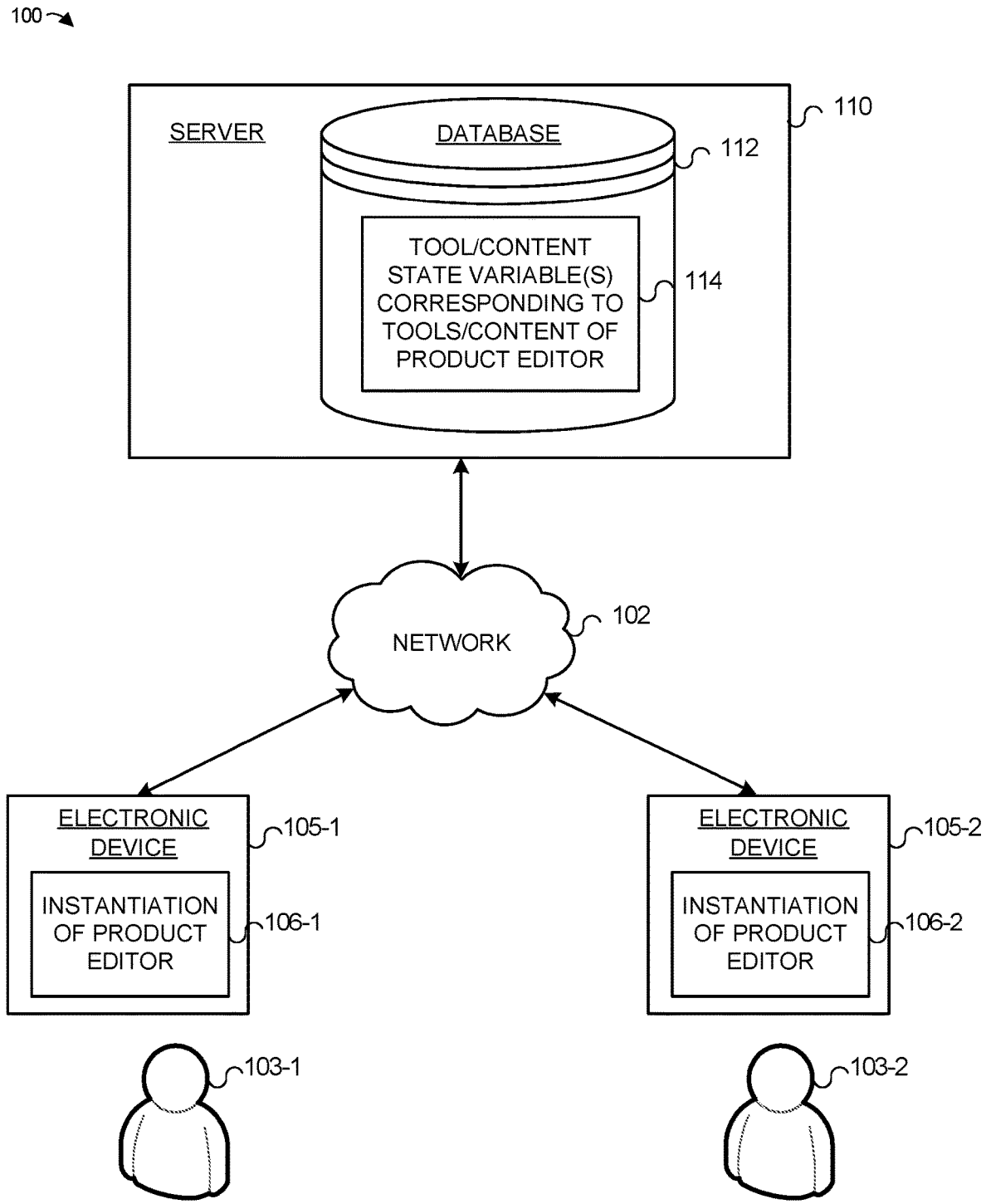
FIG. 1 depicts an overview of components and entities associated with the systems and methods, in accordance with some embodiments.

The present embodiments may relate to, inter alia, synchronizing a state of editing tools of instantiations of a printed product editor in a collaborative communication session between at least two users. For example, a single customer (or multiple customers) may be in a collaborative communication session with a customer care agent. As another example, a customer may be in a collaborative communication session with another customer (e.g., a friend).

According to certain aspects, a user (e.g., a customer) may interact with a product editor or design studio (e.g., a dedicated application installed on an electronic device, a web application, a website) using an electronic device to easily view and design a physical product or document via a user interface of the electronic device. The user may desire to design a physical product in contemplation of ordering the physical product. The design studio may offer templates that contain various graphical and/or textual content to the user. While customizing the design (either a design originated by the user or a template), the user may modify the design (e.g., the overall shape and/or size of the design) and/or certain elements of the design. In response to the user customizing the design, the electronic device may determine how the design itself and the certain elements of the design may be modified. In particular, the electronic device may access or identify certain properties or metadata of the design elements that define how the design elements may be modified, and may determine modifications to the design elements based on the properties or metadata. In this regard, the modified design and the modified design elements thereof may accurately reflect how the design and design elements are intended to look.

When the user desires assistance in using any of the editing tools offered by the design studio for editing the design of the physical product, the user may request a collaborative communication session with a remote user (e.g., customer care agent). For example, the design studio may be programmed to request a collaborative communication session with a remote user in response to a user input (e.g., selecting button, entering a user-specific code) within the design studio.

A server may generate the collaborative communication session between the user and remote user in response to the receiving request. The server may access a database that is configured to store one or more tool state variables corresponding to editing tools provided by the design studio. The server may update the one or more tool state variables corresponding to the state of tools of the design studio instantiated at the user's device when the request was received. The server may then push the updated one or more tool state variables to the design studio instantiated at the remote user's device, thereby synchronizing the state of editing tools across both instantiations of the design studio at the respective devices. The server may also update the one or more tool state variables corresponding to the state of tools of the design studio instantiated at the remote user's device and push the updated one or more tool state variables to the design studio instantiated at the user's device.

The systems and methods disclosed herein therefore offer numerous benefits. Storing, communicating, and updating tool state variables corresponding to editing tools provided by the design studio in a database results in the ability for a server that has access to the database to synchronize the state of editing tools across multiple instantiations of the design studio. Because the server specifically utilizes tool state variables corresponding to editing tools provided by the design studio, the customer care agent may view the editing tools that are currently in use by the customer and provide demonstrations of how to use the editing tools that are currently in use, or other editing tools that the user may not have considered to use. Therefore, the customers may experience greater flexibility and ease, and less frustration, in learning how to use editing tools of the design studio. Further, the server is capable of facilitating a collaborative communication session between users that is constrained to the design studio. As such, a customer need not be concerned with sharing information that may be displayed outside of the design studio with the customer care agent for example.

The systems and methods discussed herein address a challenge that is particular to e-commerce. In particular, the challenge relates to a difficulty in generating a collaborative communication session between at least two instantiations of a common design studio executed on respective electronic devices that is further constrained to the design studio, without sharing the entire screen of the respective electronic devices. The systems and methods offer improved capabilities to solve these problems by storing, communicating, and updating tool state variables corresponding to editing tools provided by the design studio. Further, because the systems and methods employ communication between and among multiple devices, the systems and methods are necessarily rooted in computer technology in order to overcome the noted shortcomings that specifically arise in the realm of e-commerce.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of electronic devices 105-1, 105-2, which may be operable by respective users 103-1, 103-2. User 103-1 may be any individual or person who may be interested in purchasing items, products, and/or services that may be offered for sale by an entity. User 103-2 may be any individual or person who provides assistance to user 103-1 on behalf of the entity. In an embodiment, the entity may be a corporation, company, partnership, retailer, wholesaler operating on behalf of another entity (e.g., a white label wholesaler), or the like, where the entity may offer an e-commerce platform in the form of a design studio (e.g., a website, a web application, a dedicated application) accessible or executable by the electronic devices 105-1, 105-2) and optionally a set of brick-and-mortar retail stores. Each of the electronic devices 105-1, 105-2 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 105-1, 105-2 may communicate with a central server 110 via one or more networks 102. The server 110 may be associated with the entity that owns and/or manages the e-commerce platform(s) and/or the set of brick-and-mortal retail stores. In particular, the server 110 may include or support a web server configured to host a website that offers various products and/or services for purchase by users. Further, the server 110 may support a software application executable by the set of electronic devices 105-1, 105-2 (i.e., the set of electronic devices 105-1, 105-2 may interface with the server 110 in executing the software application). In embodiments, the network(s) 102 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single server 110 in FIG. 1, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 105-1, 105-2 interface with the server 110, the electronic devices 105-1, 105-2 may actually interface with one or more of a number of distributed computers, servers, machines, or the like, to facilitate the described functionalities.

The server 110 may be configured to interface with or support a memory or storage capable of storing various data, such as in one or more databases 112 or other forms of storage. According to embodiments, database 112 may store data or information associated with products or services that are offered for sale by the entity that owns and/or manages the e-commerce platform and/or the set of brick-and-mortal retail stores. Particularly, database 112 may store tool state variable(s) and content state variable(s) 114 corresponding to tools and content, respectively, specific to the design studio application. That is, tool state variable(s) and content state variable(s) 114 are application variable(s) that are specific to and limited to a particular state of the design studio application. As such, the tool state variable(s) and content state variable(s) 114, or its data or values thereof or stored therein, individually represent the respective state of a particular tool (e.g., color tool, paint tool, color tool) or content (e.g., text field, image) of a design studio application, and collectively represent a particular state of the entire design studio application (e.g., a text field highlighted with the color tool). Database 112 may also store protected and/or public domain digital images and/or design elements, templates of designs, as well as information associated with the designs, including properties of the elements/components of the designs. The images and design elements may be sorted, classified, categorized, and/or the like. Although database 112 is depicted as being integrated within the server 110, it should be appreciated that database 112 may be an external database communicatively coupled with the server 110.

Although two (2) electronic devices 105-1, 105-2 and one (1) server 110 are depicted in FIG. 1, it should be appreciated that greater or fewer amounts are envisioned. For example, there may be multiple servers, each one associated with a different entity.

According to embodiments, the users 103-1, 103-2 may use the respective electronic devices 105-1, 105-2 to facilitate a shared session to co-edit a design for a printed product. Particularly, when the user 103-1 (e.g., customer) desires assistance in using any of the editing tools offered by the design studio for editing the design of a physical product, the user 103-1 may request a collaborative communication session with the user 103-2 (e.g., customer care agent). The printed product may be a print, promotional, embroidery, or engraving, or other suitable product, such as those offered by Vistaprint®.

Server 110 may generate the collaborative communication session between users 103-1, 103-2. Server 110 may then update the tool state variable(s) and content state variable(s) corresponding to the state of tools and content of the instantiated design studio 106-1 at electronic device 105-1. Subsequently, the server 110 may push the updated tool state variable(s) and content state variable(s) to the instantiated design studio 106-2 at electronic device 105-2, thereby synchronizing the state of tools and content across both instantiations 106-1, 106-2 of the design studio at electronic devices 105-1, 105-2. Server 110 may also update the tool state variable(s) and content state variable(s) corresponding to the state of tools and content of the instantiated design studio 106-2 at electronic device 105-2 and push the updated tool state variable(s) and content state variable(s) to the instantiated design studio 106-1 at electronic device 105-1.

Accordingly, the server 110 and electronic devices 105-1, 105-2 may be synchronized with respect to the state of tools and content of the design studio. For example, if a button corresponding to a cropping tool, layering tool, or color tool is displayed and selected in the instantiated design studio 106-1 at electronic device 105-1, the same button may be displayed and selected in the instantiated design studio 106-2 at electronic device 105-2, and vice versa. Similarly, if a text field and a design element of a design displayed and selected in the instantiated design studio 106-1 at electronic device 105-1 have characteristics or properties (e.g., as defined by metadata) corresponding to the text string "My business!!" and an image of a donut, the text string "My business!!" and donut image may be displayed and selected in the instantiated design studio 106-2 at electronic device 105-2, and vice versa. Any modifications made in the instantiated design studio 106-1 (e.g., selecting a particular tool, deselecting a particular tool, changing a text string, changing an image) may seamlessly appear in the instantiated design studio 106-2, and vice versa, because the server 110 may monitor and track any changes to the state of tools and content of the design in the instantiated design studios 106-1, 106-2, and subsequently update the tool state variable(s) and content state variable(s) corresponding to the changed state of the tools and content, respectively, of the instantiated design studios 106-1, 106-2.

Figure 2:
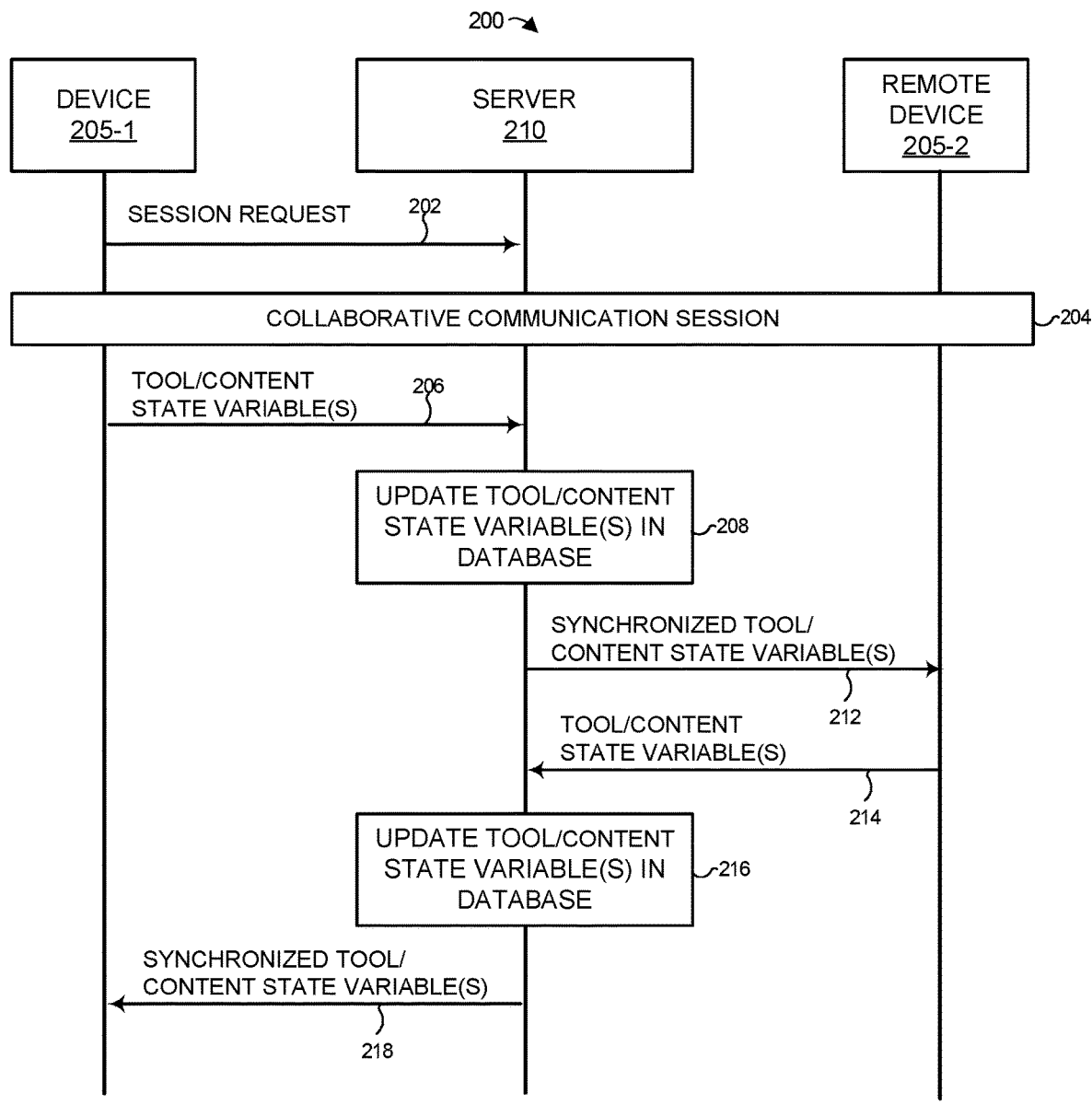
FIG. 2 depicts a data flow diagram associated with co-editing a design for a printed product using components and entities of FIG. 1, in accordance with some embodiments.

FIG. 2 depicts a signal diagram 200 associated with co-editing a design for a printed product. The signal diagram 200 includes a client device 205-1 (such as electronic device 105-1 as discussed with respect to FIG. 1), a remote/web server 210 (such as the server 110 as discussed with respect to FIG. 1), and a remote device 205-2 (such as electronic device 105-2 as discussed with respect to FIG. 1). According to embodiments, the server 210 may support a website (e.g., a product design website) or design studio application that is accessible by the client device 205-1 via a network connection, where a user of the client device 205-1 may use the client device 205-1 to make selections associated with the website or design studio application.

The signal diagram 200 may begin when the client device 205-1 sends (202) a session request to the server 210. In embodiments, the client device 205-1 may access the website or design studio application supported by the server 210, and a user of the client device 205-1 may use the client device 205-1 to make certain selections associated with a collaborative communication session with a remote user (e.g., customer care agent). For example, the user may select a particular button or enter in a user-specific code into the website or design studio application, which triggers a session request to be sent the server 210.

After the server 210 receives the session request, the server 210 initiates (204) a collaborative communication session with a remote device 205-2. The server 210 may select the remote device 205-2 based on availability (e.g., the remote device 205-2 is not currently in a session while other remote devices are in a session), or based on a code-based rule (e.g., the remote device 205-2 is preconfigured to respond to a range of codes that includes the user-specific code entered in by the user of the client device 205-1) stored in a database (e.g., database 112).

During the collaborative communication session, the client device 205-1 sends (206) tool and/or content state variable(s) of the website or design studio application to the server 210. In response, the server 210 updates (208) the tool and/or content state variable(s) in the database. Although steps 206 and 208 are depicted as occurring after step 204, it should be appreciated that 206 and 208 may occur before step 204. For example, client device 205-1 may provide the session request and tool and/or content state variable(s) simultaneously to the server 210.

To synchronize the state of editing tools and content that displays on the client device 205-1 at the remote device 205-2, the server 210 sends (212) the updated tool and/or content state variable(s) that was stored in the database from step 208. In this way, the remote device 205-2 may display the state of both the tools and content as displayed on the client device 205-1. For example, if a user of the client device 205-1 selected a color fill tool corresponding to "red" to change the background of a design element from white to red, the remote device 205-2 may display the selected color fill tool corresponding to "red" in addition to the red design element.

The collaborative communication session may be integrated with a text session, a phone call session, or a video session, so that the user of the client device 205-1 may seek assistance by communicating (e.g., texting, calling, video conferencing) with the user of the remote device 205-2. For example, the user of the client device 205-1 may seek assistance as to using the color fill tool to change the "red" setting to a "red gradient" setting so that the background of the design element can be set to a "red gradient" as opposed to "red." Because the remote device 205-2 may display the state of the color tool and content displayed on the client device 205-1, the user of the remote device 205-2 may manipulate the color tool (or another tool, such as the gradient tool that is separate from the color fill tool) to set it to the "red gradient" setting, and set the background of the design element from "red" to "red gradient." Such manipulation of the color tool and background design element changes the state of the color tool (i.e., from a "red" state to a "red gradient" state) and the background design element (i.e., from a "red" background state to a "red gradient" state).

In response to the state change, the remote device 205-2 reports the state change by sending (214) the instant state of the tool (e.g., color tool) and/or the content (e.g., background design element) to the server 210, which in turn updates (216) the tool and/or content state variable(s) corresponding to the color tool and background design element in the database.

To synchronize the state of editing tools and content that displays on the remote device 205-2 at the client device 205-1, the server 210 sends (218) the updated tool and/or content state variable(s) that was stored in the database from step 216. In this way, the client device 205-1 may display the state of both the tools and content (e.g., the color tool set to "red gradient," the background design element set to "red gradient") as displayed on the remote device 205-2.

Figure 3A:
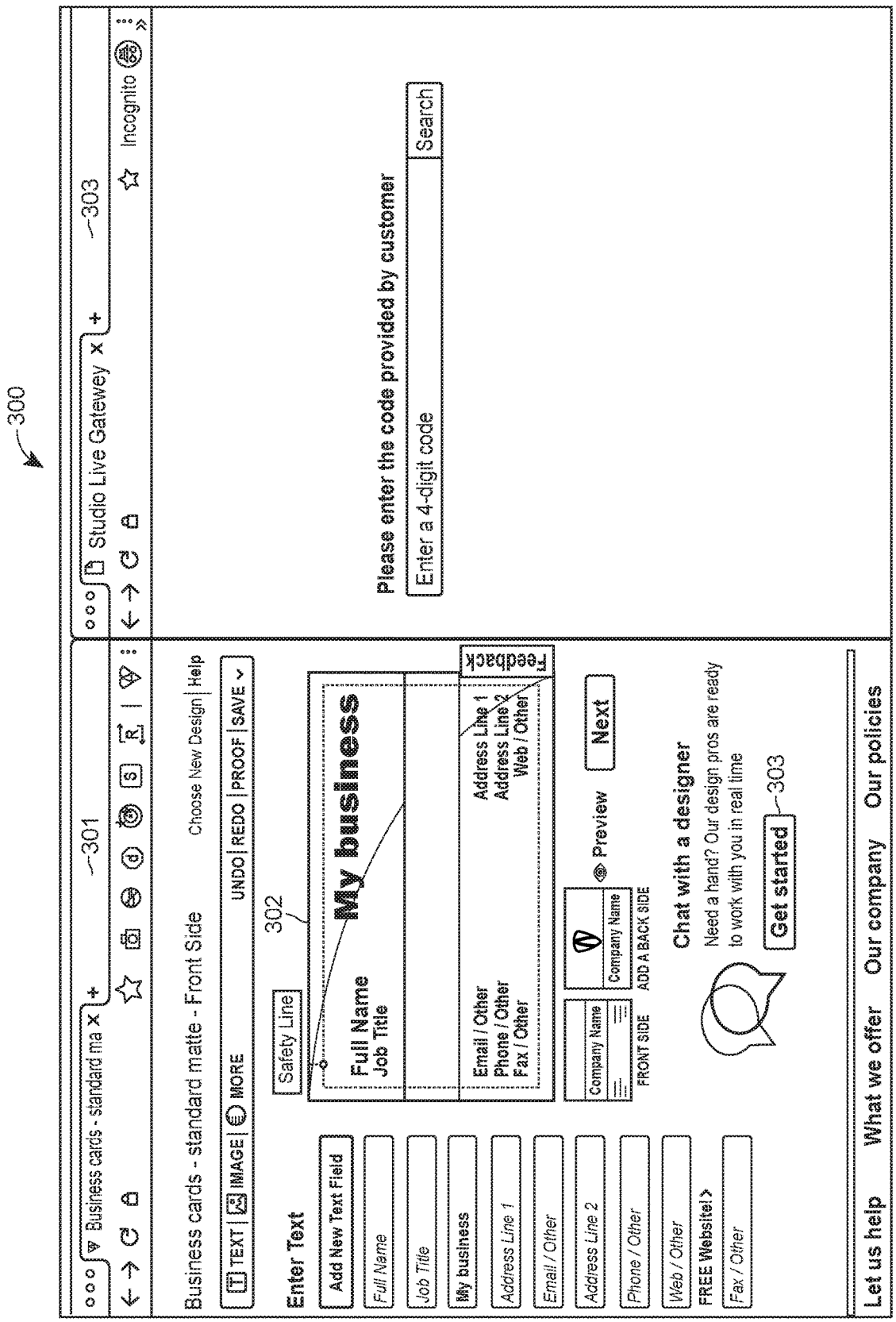
FIGS. 3A-3C depict user interfaces of a user device and a remote user device when initiating a collaborative communication session, in accordance with some embodiments.
Figure 3B:
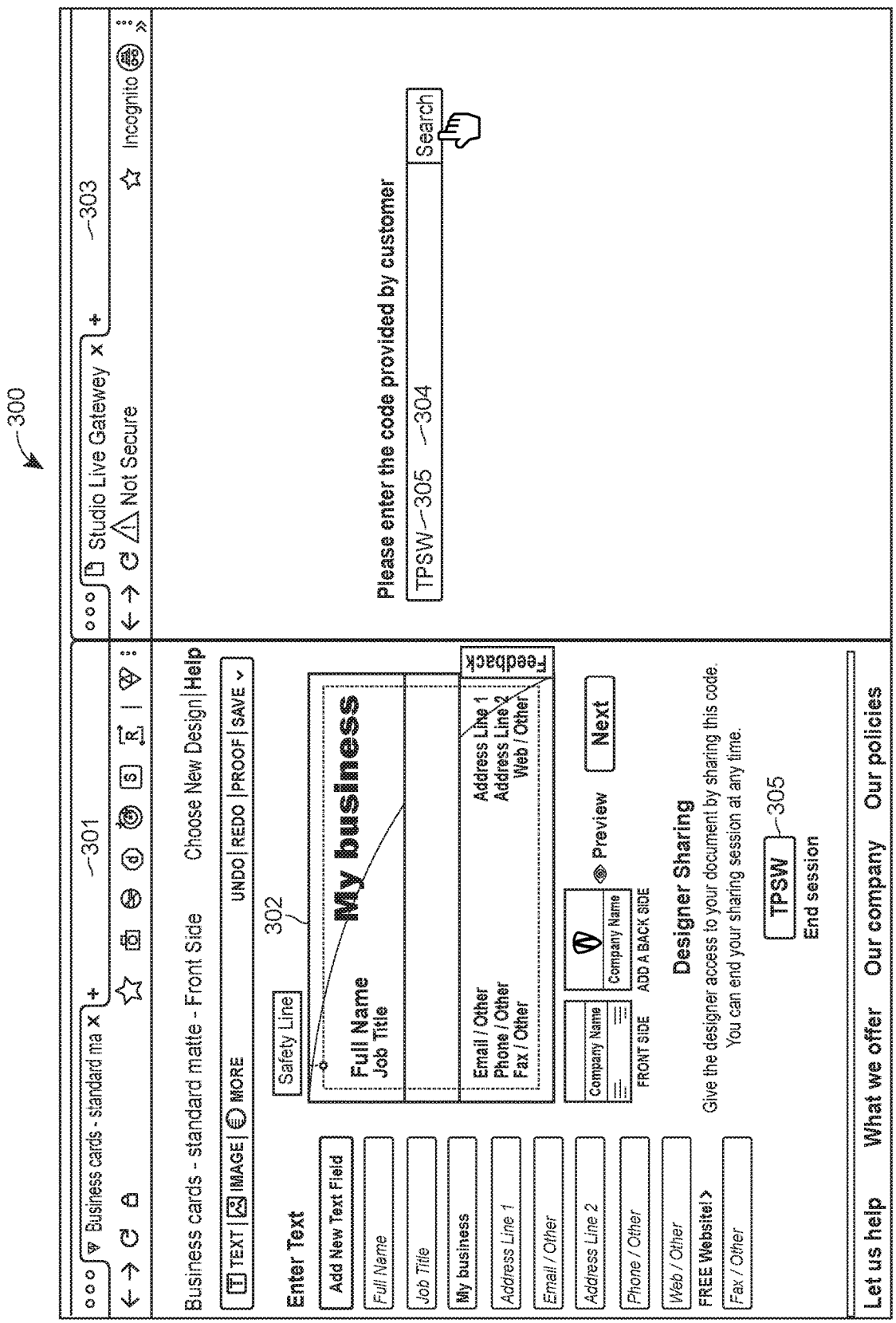
Figure 3C:
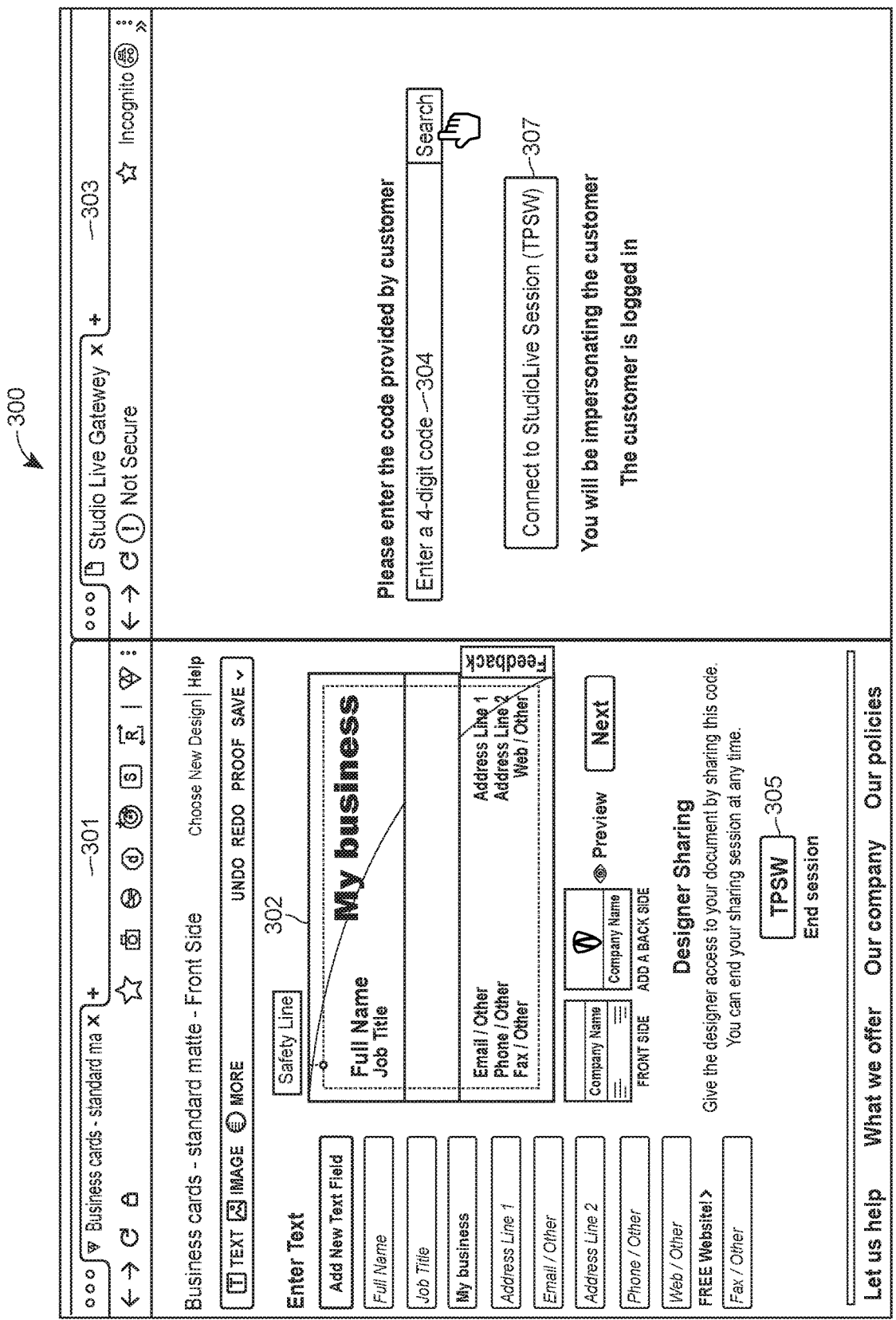

FIGS. 3A-3C depict example user interfaces 300 of a user device (e.g., client device 205-1) and a remote user device (e.g., remote device 205-2) when initiating a collaborative communication session. It should be appreciated that the elements of the user interfaces 300 are merely exemplary and that alternative and additional elements are envisioned. Further, although the interfaces 300 of FIGS. 3A-3C as depicted may be associated with a printed product editor in the platform of a website, other platforms, such as a dedicated application native to the user device and a remote user device, are envisioned.

As shown in FIG. 3A, the client device, upon executing the printed product editor, may display a template 302 (e.g., for a business card) for a product design via a client user interface 301. It should be appreciated that the templates, designs, and design elements thereof are merely exemplary and that alternative and additional templates, designs, and design elements are envisioned. Further, although the templates and designs of FIG. 3A as depicted may be associated with business cards, other alternative and additional products are envisioned.

The client user interface 301 may include a button 303, which is programmed to request (e.g., step 202 of FIG. 2) a collaborative communication session with a remote device upon selection by the user of the client device. The remote device, upon executing the printed product editor, may display a remote user interface 303. The remote user interface 303 may include a field 304, which is programmed to fulfill the collaborative communication session request from the client device when the remote user of the remote device provides a code specific to the printed product editor executing on the client device. The code may be a static code (e.g., numeric, alphanumeric, etc.) specific to the printed product editor purchased by the user, or may be a dynamic code generated by a server (e.g., server 210) each time the client device requests for a code.

As shown in FIG. 3B, the client user interface 301 may display the code 305 upon selection of the button 303. The printed product editor executed at the client device may be programmed to provide the code 305, or the server may be configured to provide the code 305 to the client device, upon selection of the button 303. In any event, the client device may provide the code 305 to the server, which in turn may provide the code 305 to the remote device. Alternatively, the client device may be configured to provide the code 305 directly to the remote device. Upon receipt, a user of the remote device may input the code 305 into the field 304. If the code 305 is indeed the correct code assigned to the client device (as determined by the remote device or the server), the remote user interface 303 may display a button 307 to fulfill the collaborative communication session request from the client device, as shown in FIG. 3C, so that the server may establish (e.g., step 204 of FIG. 2) the collaborative communication session.

Figure 4A:
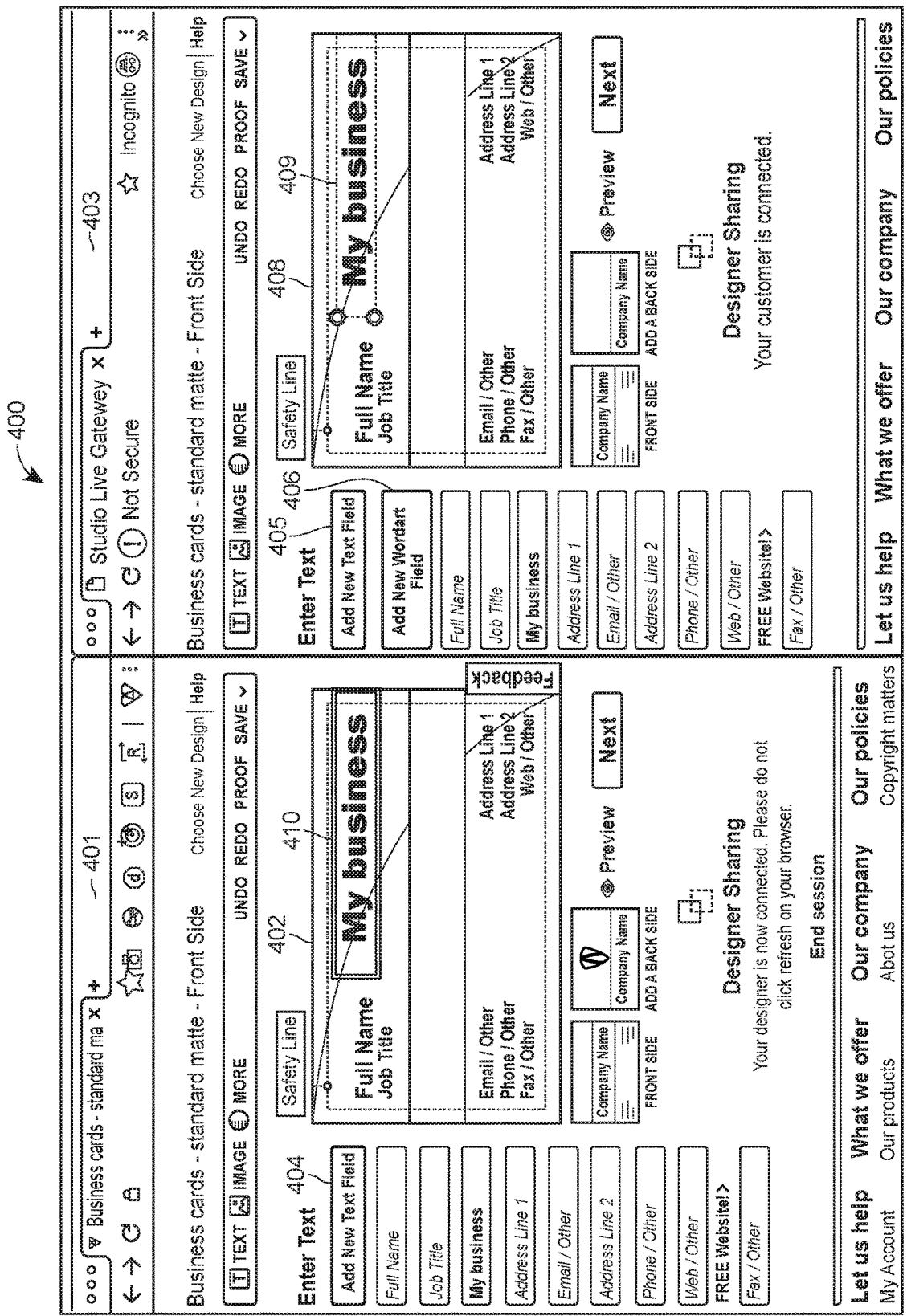
FIGS. 4A-4C depict user interfaces of a user device and a remote user device when co-editing a design for a printed product during a collaborative communication session, in accordance with some embodiments.
Figure 4B:
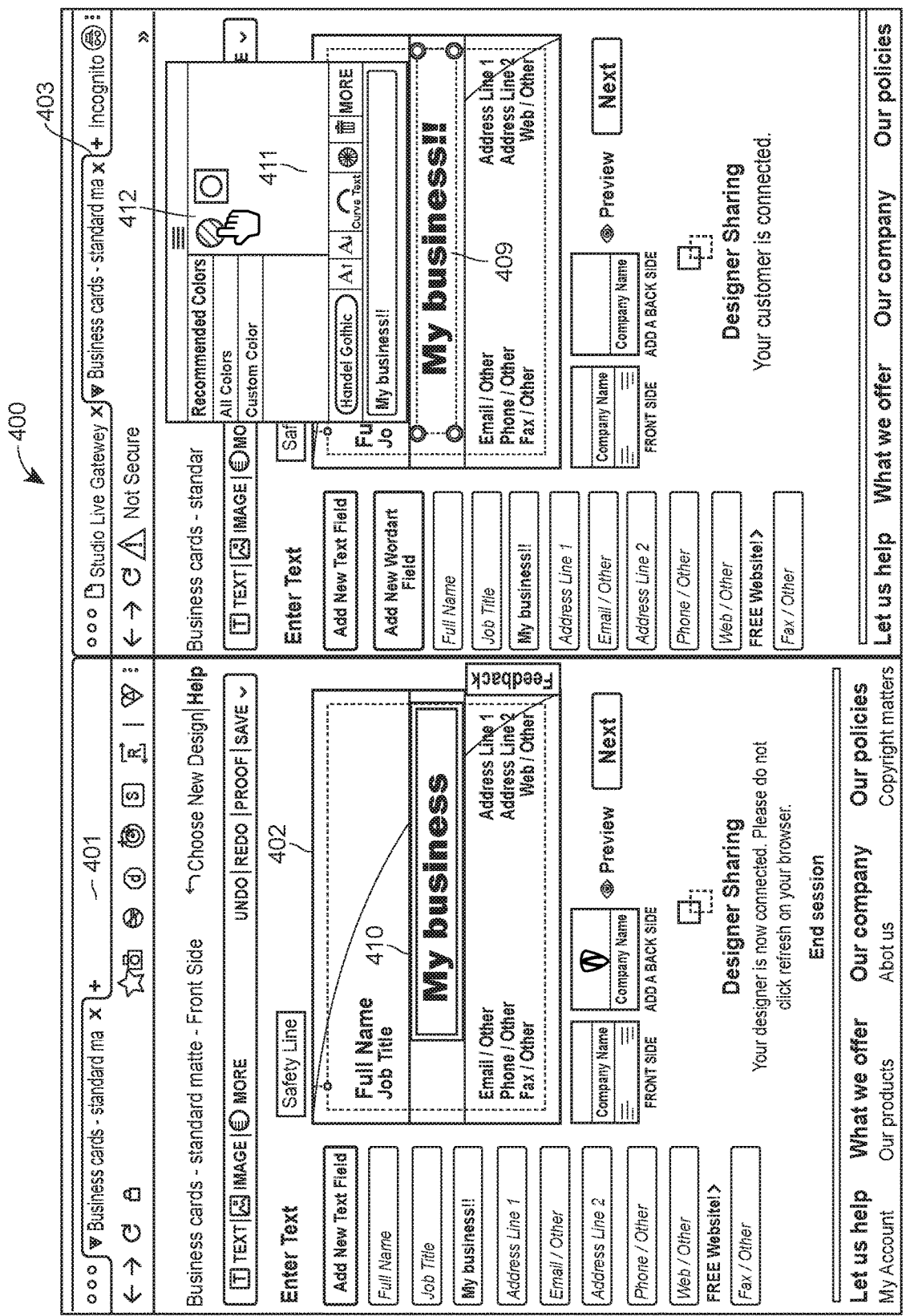
Figure 4C:
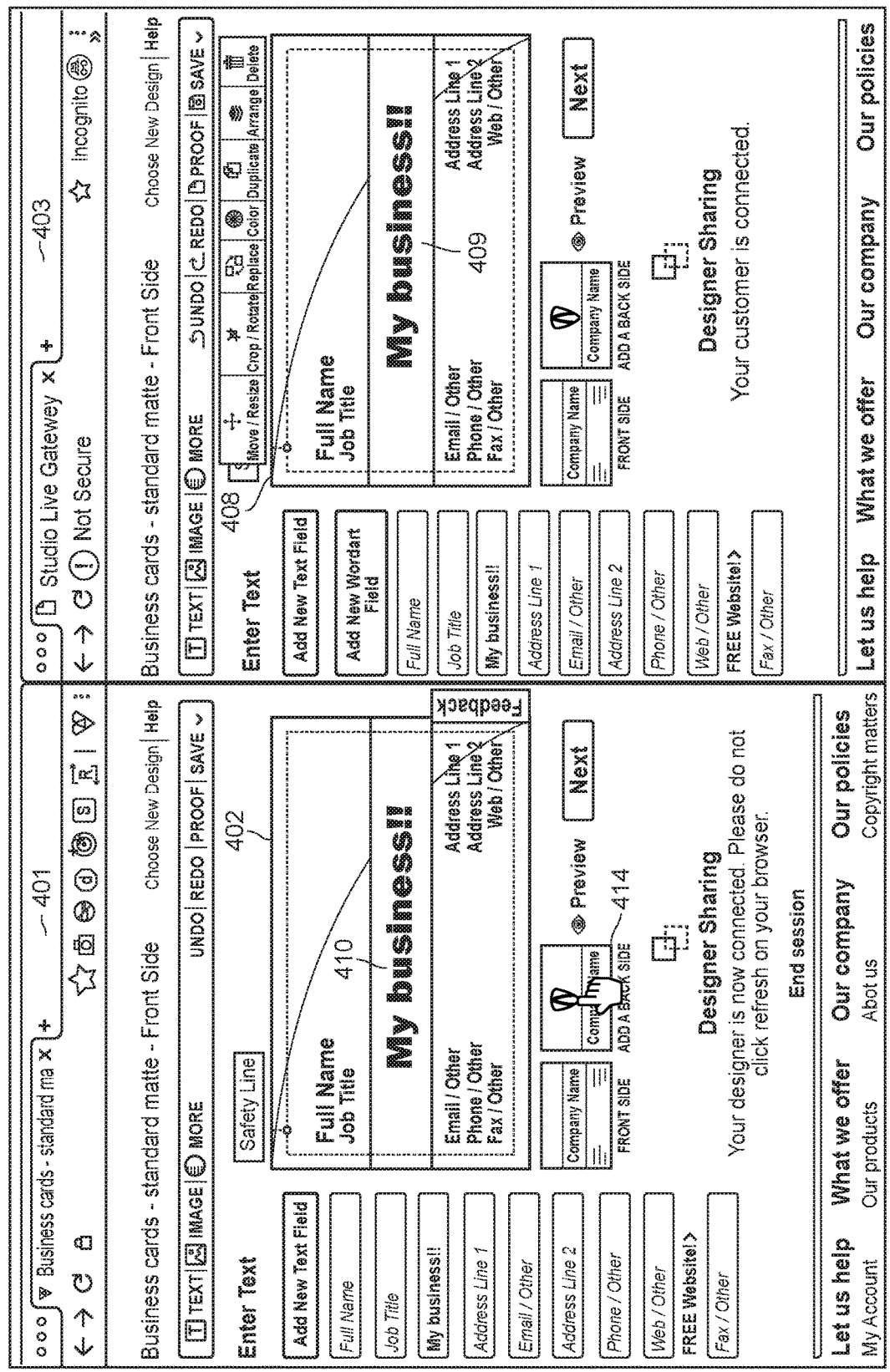

FIGS. 4A-4C depict example user interfaces 400 of a user device (e.g., client device 205-1) and a remote user device (e.g., remote device 205-2) after a successful initiation of a collaborative communication session. That is, upon the successful initiation of a collaborative communication session between the client device and remote device, the devices are executing instantiations of a printed product editor for display at the respective user interfaces 400.

As shown in FIG. 4A, the remote user interface 403 displays selection of tool 405 that corresponds to the selected tool 404 displayed on the client user interface 401. In addition, the remote user interface 403 displays content 409 of template 408 that corresponds to content 410 of template 402 displayed on the client user interface 401. Other information that may be displayed at the client device outside of the client user interface 401 may not be displayed at the remote user interface 403, thereby maintaining the privacy of the user of the client device. Synchronizing the tool selection and/or content of the client user interface 401 (and constrained to the client user interface 401) with the remote user interface 403 is possible because the server (e.g., server 210) receives (e.g., step 206 of FIG. 2) the tool and/or content state variable(s), or values thereof, corresponding to the selected tool 404 and content 410 of template 402 and subsequently updates (e.g., step 208 of FIG. 2) the tool and/or content state variable(s) in a database with the tool and/or content state variable(s), or values thereof, corresponding to the selected tool 404 and content 410 of template 402 displayed on the client user interface 401. In response, the server subsequently provides (e.g., step 212 of FIG. 2) the tool and/or content state variable(s) and/or its values to the remote device for display on the remote user interface 403.

In some embodiments, as shown in FIG. 4A, some tools, (e.g., tool 406) may not display on the client user interface 401 but may display on the remote user interface 403. This may occur if the user of the client device does not have the most up-to-date version of the design studio, or if the commercial version of the design studio does not include all the capabilities of a master design studio. Therefore, the server may be configured to selectively update tool and/or content state variable(s) corresponding to the state of a subset of the editing tools (e.g., tool 404) rather than all of the editing tools (e.g., including tool 406) available using the design studio. As such, only the state of the subset of the editing tools may be synchronized during the collaborative communication session.

As shown in FIG. 4B, the user of the remote device may inform the user of the client device how to use certain tools (e.g., tools 411, 412) offered in the design studio. Again, because the tool and/or content state variable(s) are synchronized between the two devices, the user of the remote device is easily able to provide instructions to the user of the client device because the user of the remote device is aware of the state in which the design studio is in. That is, the user of the remote device is able to pick up from where the user of the client device left off, which significantly reduces the time needed for the user of the client device to explain the steps that he or she took to get to a particular state of the design studio executing at the client device. While informing the user of the client device how to use certain tools (e.g., tools 411, 412), the effect of using such tools applied to the template 408 (e.g., changing the color of text) may be shared with the client device, as shown in FIG. 4C. That is, the remote device may send (e.g., step 214 of FIG. 2) the tool and/or content state variable(s) and/or its values corresponding to the effected content 409 to the server, which in turn updates (e.g., step 216 of FIG. 2) the tool and/or content state variable(s) and/or its values stored in the database. Subsequently, the server may provide (e.g., step 218 of FIG. 2) the tool and/or content state variable(s) and/or its values corresponding to the effected content 409 to the client device, which in turn may realize the effects in an updated content 410 of template 402 displayed on the client user interface 401.

The user of the client device may desire to receive further assistance as to how to design the back side of a product during the collaborative communication session. Upon selection of button 414, both the user interfaces of the client device and remote device may be updated to display the back side of the product, as shown in example user interfaces 500 of a user device and a remote user device depicted in FIGS. 5A-5B.

Figure 5A:
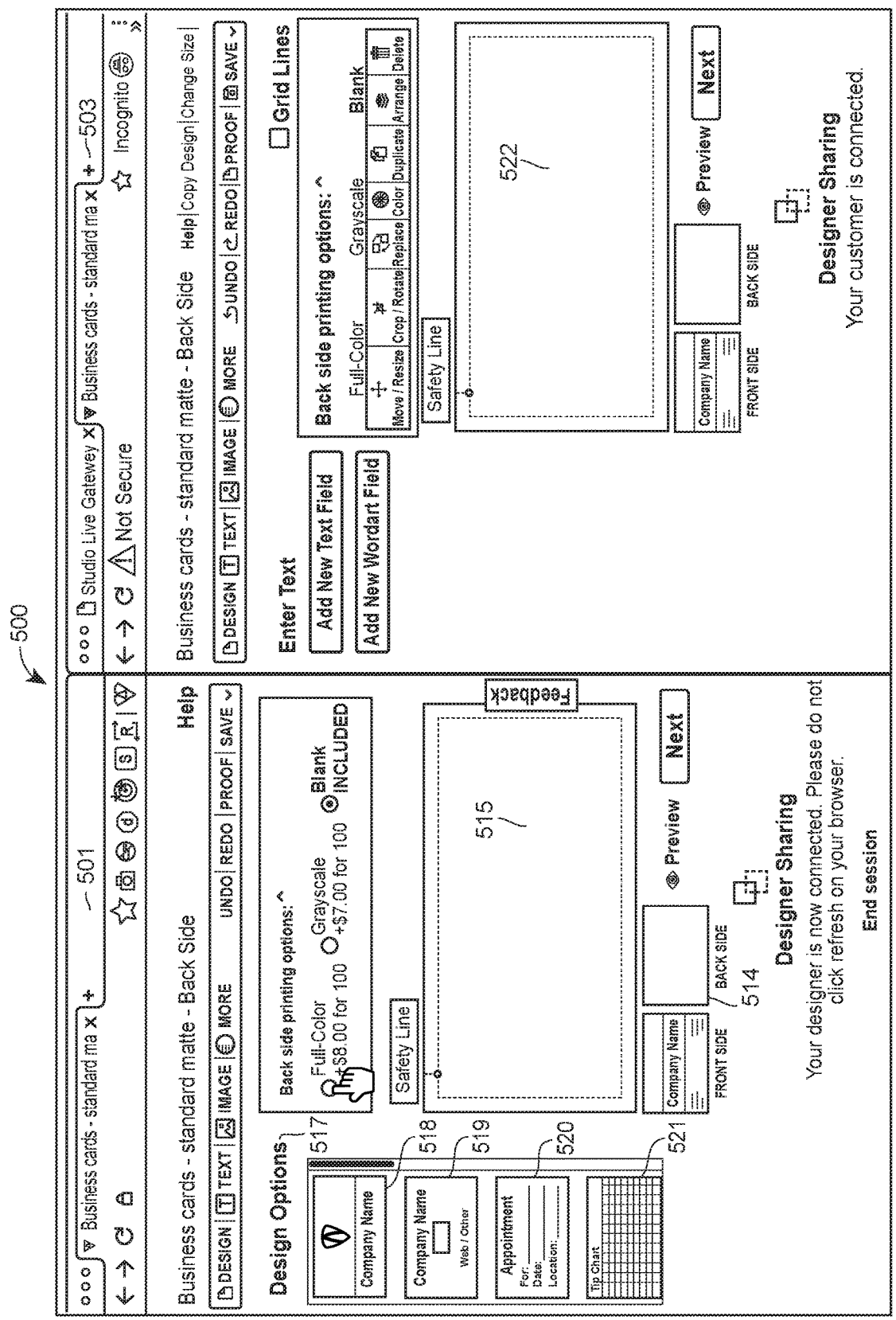
FIGS. 5A-5B depict user interfaces of a user device and a remote user device when co-editing another design for a printed product during a collaborative communication session, in accordance with some embodiments.

As shown in FIG. 5A, some tools, (e.g., tool 517 for displaying design options 518, 519, 520, and 521) may not display on the remote user interface 503 but may display on the client user interface 501. This may occur if the users of the devices have different versions of the design studio, for example. As discussed above, the server may be configured to selectively update tool and/or content state variable(s) corresponding to the state of a subset of the editing tools (e.g., tool 514 for flipping the design to a back side) rather than all of the editing tools (e.g., including tool 517) available using the design studio. In this example, the state of all of the content (e.g., content 515 and 522) may be synchronized across all devices, but in other embodiments, a subset of the content may also be selectively synchronized, in a manner similar to selectively synchronizing the state of a subset of the editing tools.

Figure 5B:
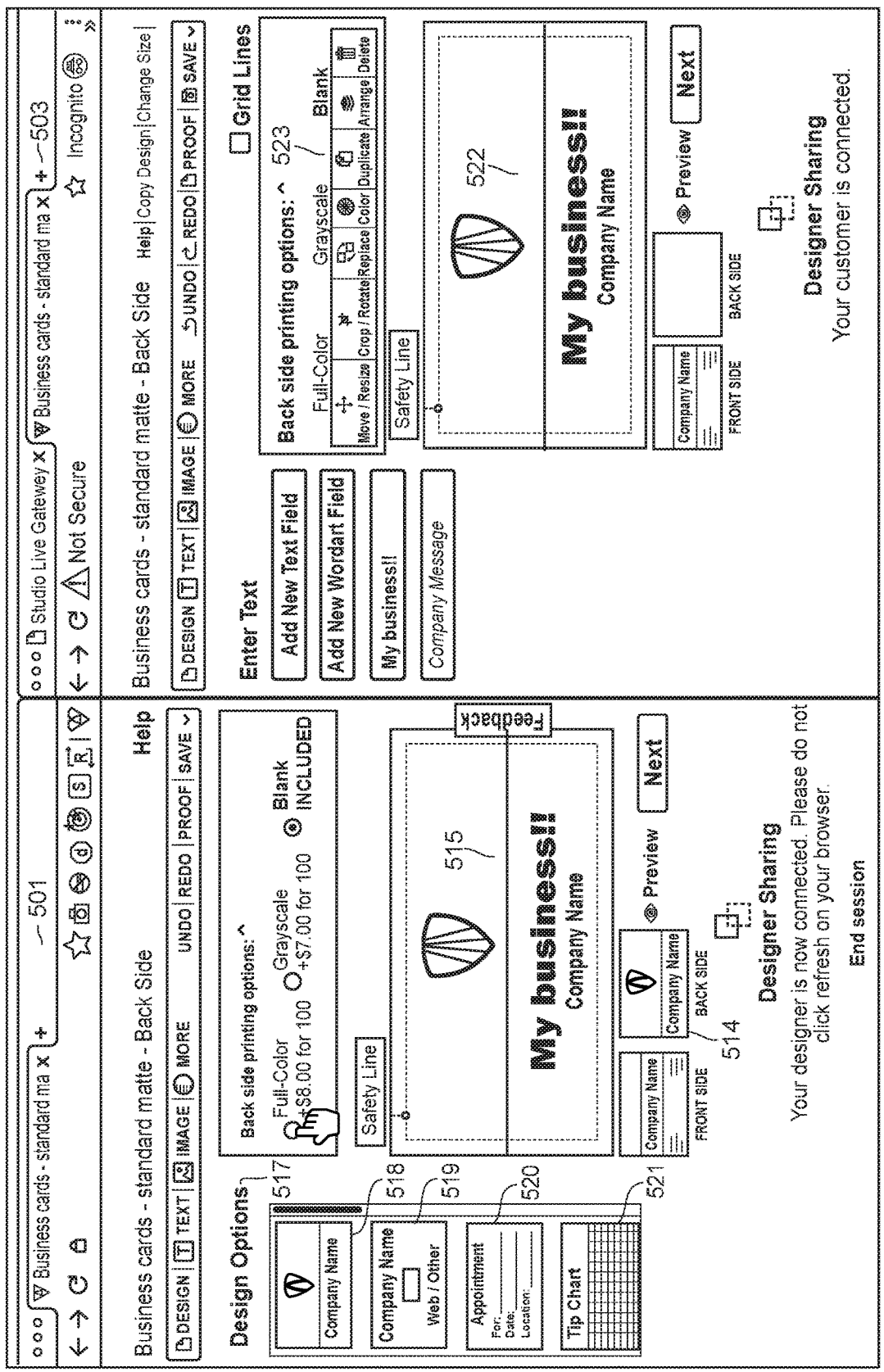

As shown in FIG. 5B, the user of the remote device may inform the user of the client device how to use certain tools (e.g., tool 523) offered in the design studio. Again, because the tool and/or content state variable(s) are synchronized between the two devices, the user of the remote device is easily able to provide instructions to the user of the client device because the user of the remote device is aware of the state (e.g., selection of tool 514) in which the design studio is in. While informing the user of the client device how to use certain tools (e.g., tool 514), the effect of using such tools applied to content 522 (e.g., changing the color of text) may be shared with the client device in the form of content 515. That is, the remote device may send (e.g., step 214 of FIG. 2) the tool and/or content state variable(s) and/or its values corresponding to the effected content 522 to the server, which in turn updates (e.g., step 216 of FIG. 2) the tool and/or content state variable(s) and/or its values stored in the database. Subsequently, the server may provide (e.g., step 218 of FIG. 2) the tool and/or content state variable(s) and/or its values corresponding to the effected content 522 to the client device, which in turn may realize the effects in an updated content 515 displayed on the client user interface 501.

Figure 6:
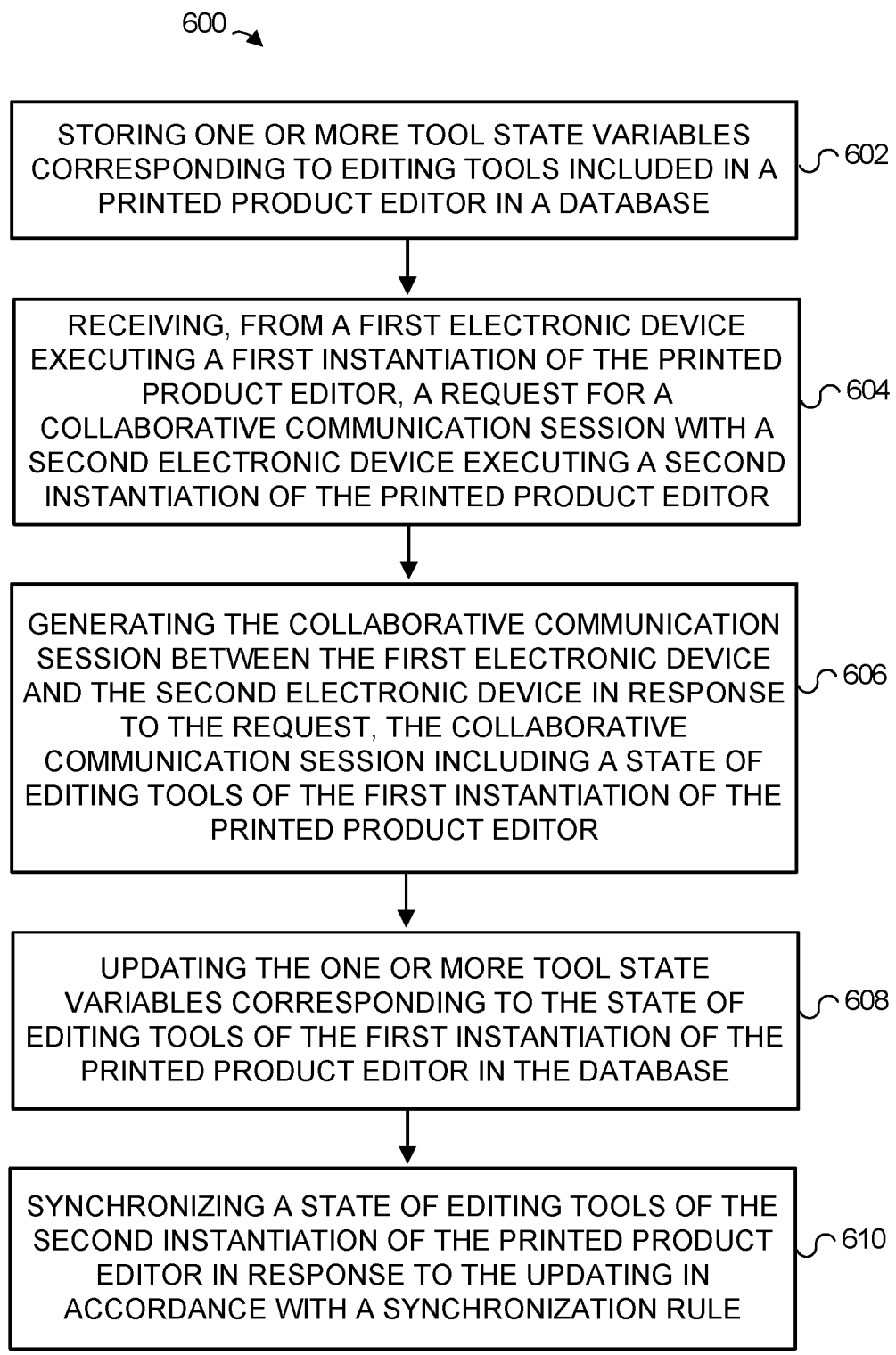
FIG. 6 depicts a block diagram of an example method of co-editing a design for a printed product, in accordance with some embodiments.

FIG. 6 depicts an example method 600 for co-editing a design for a printed product. The method 600 may be facilitated by an electronic device (e.g., user device 105-1, 205-1, remote device 105-2, 205-2) that may be in communication with a server (e.g., server 110, 210).

The method 600 begins at block 602, where the server (e.g., server 110, 210) stores one or more tool state variables (e.g., variable(s) 114), corresponding to editing tools (e.g., tools 404, 405, 406, 411, 412, 514, 517, 523) included in a printed product editor in a database (e.g., database 112). The server may also store one or more content state variables (e.g., variable(s) 114) corresponding to content (e.g., content 409, 410, 515, 522, templates 302, 402, 408) in the database.

At block 604, the server subsequently receives (e.g., step 202), from a first electronic device (e.g., user device 105-1, 205-1) executing a first instantiation (e.g., instantiation 106-1) of the printed product editor, a request for a collaborative communication session with a second electronic device (e.g., remote device 105-2, 205-2) executing a second instantiation (e.g., instantiation 106-2) of the printed product editor.

At block 606, the server generates (e.g., step 204) the collaborative communication session between the first electronic device and the second electronic device in response to the request. The collaborative communication session includes a state of editing tools of the first instantiation of the printed product editor.

At block 608, the server updates (e.g., step 208) the one or more tool state variables corresponding to the state of editing tools of the first instantiation (e.g., step 206) of the printed product editor in the database.

At block 610, the server synchronizes (e.g., step 212) a state of editing tools of the second instantiation of the printed product editor in response to the updating.

Figure 7:
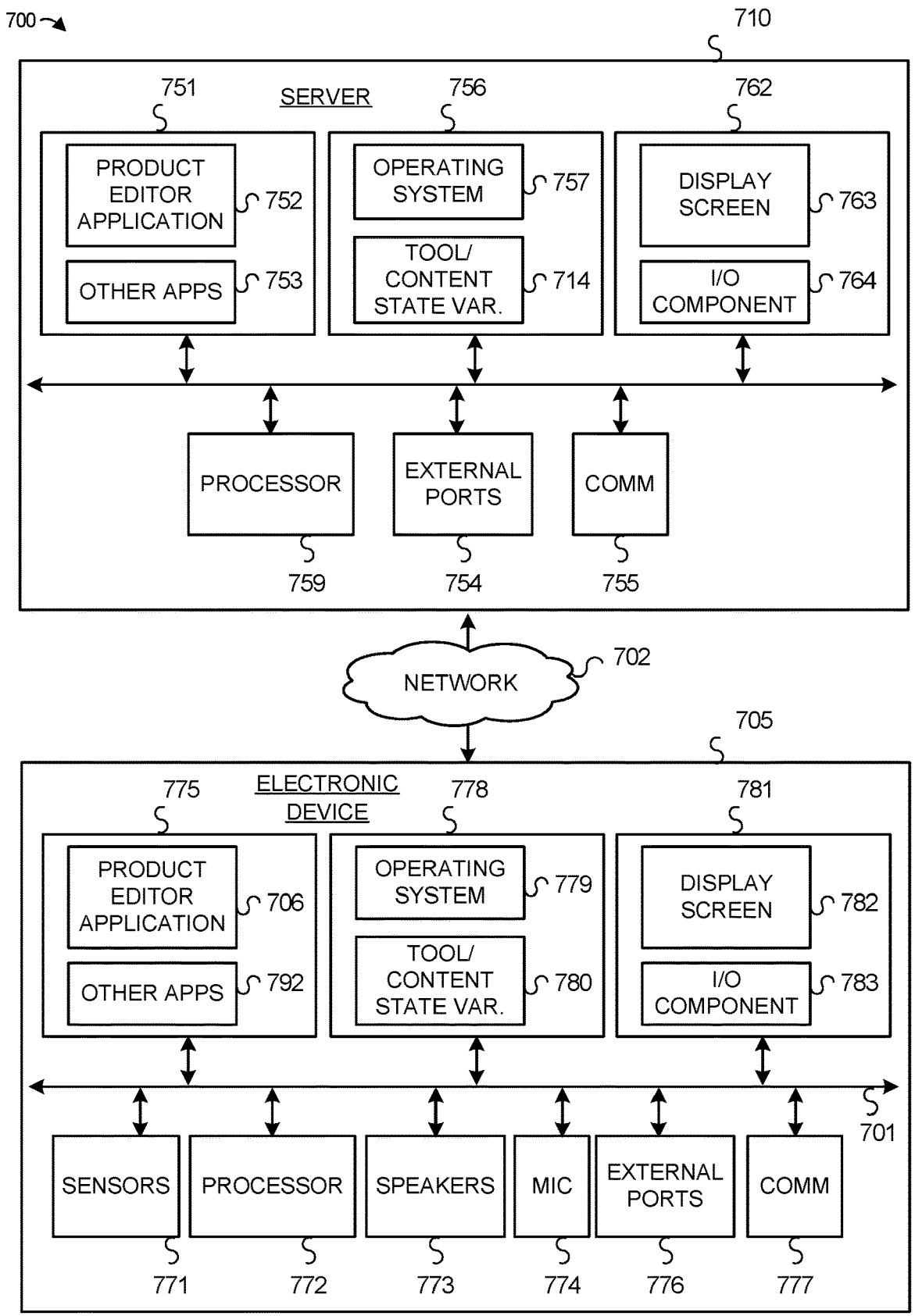
FIG. 7 is a block diagram of an example electronic device and an example server, in accordance with some embodiments.

FIG. 7 illustrates a hardware diagram of an example electronic device 705 (such as one of the electronic devices 105-1, 105-2 as discussed with respect to FIG. 1) and an example server 710 (such as the server 110 as discussed with respect to FIG. 1), in which the functionalities as discussed herein may be implemented.

The electronic device 705 may include a processor 772 as well as a memory 778. The memory 778 may store an operating system 779 capable of facilitating the functionalities as discussed herein as well as a set of applications 775 (i.e., machine readable instructions). For example, one of the set of applications 775 may be a product editor application 706 configured to facilitate certain product designing functionalities as discussed herein. It should be appreciated that one or more other applications 792, such as a web browser application, are envisioned.

The processor 772 may interface with the memory 778 to execute the operating system 779 and the set of applications 775. Memory 778 may store tool and/or content state variable(s) 780 that may include data accessed or collected by the set of applications 775. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 705 may further include a communication module 777 configured to communicate data via one or more networks 702. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776.

The electronic device 705 may include a set of sensors 771 such as, for example, a location module (e.g., a GPS chip), an image sensor, a clock, a gyroscope (i.e., an angular rate sensor), a compass, a tilt sensor, and/or other sensors. The electronic device 705 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs). According to some embodiments, the user may access the electronic device 705 via the user interface 781 to review information such product renderings, make design selections and modifications, and/or perform other functions. Additionally, the electronic device 705 may include a speaker 773 configured to output audio data and a microphone 774 configured to detect audio, for use during a video session integrated with the collaborative communication session, for example.

In some embodiments, the electronic device 705 may perform the functionalities as discussed herein as part of a "cloud" network or may otherwise communicate with other hardware or software components within the cloud to send, retrieve, or otherwise analyze data.

As illustrated in FIG. 7, the electronic device 705 may communicate and interface with the server 710 via the network(s) 702. The server 710 may include a processor 759 as well as a memory 756. The memory 756 may store an operating system 757 capable of facilitating the functionalities as discussed herein as well as a set of applications 751 (i.e., machine readable instructions). For example, one of the set of applications 751 may be a product editor application 752 configured to facilitate various of the product design functionalities discussed herein. It should be appreciated that one or more other applications 753 are envisioned.

The processor 759 may interface with the memory 756 to execute the operating system 757 and the set of applications 751. The memory 756 may store tool and/or content state variable(s) 714 that may include data accessed or collected by the set of applications 751. The memory 756 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 710 may further include a communication module 755 configured to communicate data via the one or more networks 702. According to some embodiments, the communication module 755 may include one or more transceivers (e.g., WWAN, WLAN, and/or WPAN transceivers) functioning in accordance with IEEE standards, 3GPP standards, or other standards, and configured to receive and transmit data via one or more external ports 754. For example, the communication module 755 may receive, from the electronic device 705, requests for assistance.

The server 710 may further include a user interface 762 configured to present information to a user and/or receive inputs from the user. As shown in FIG. 7, the user interface 762 may include a display screen 763 and I/O components 764 (e.g., ports, capacitive or resistive touch sensitive input panels, keys, buttons, lights, LEDs). According to some embodiments, the user may access the server 710 via the user interface 762 to review information, provide assistance to a customer, make changes, and/or perform other functions.

In some embodiments, the server 710 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 772, 759 (e.g., working in connection with the respective operating systems 779, 757) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of co-editing a design for a printed product, the computer-implemented method comprising:
    storing, by one or more processors and in a database, one or more tool state variables corresponding to editing tools included in a printed product editor for editing content included in the printed product;
    receiving, by the one or more processors and from a first electronic device executing a first instantiation of the printed product editor including first editing tools, a request for a collaborative communication session with a second electronic device executing a second instantiation of the printed product editor including second editing tools;
    generating, by the one or more processors, the collaborative communication session between the first electronic device and the second electronic device in response to the request, the collaborative communication session including a state of the second editing tools, wherein the second editing tools includes all of the first editing tools and at least one additional editing tool that is not included in the first instantiation of the printed product editor, and wherein the at least one additional editing tool displays a plurality of design options corresponding to a plurality of templates for the design for the printed product;
    selectively updating, by the one or more processors and in the database, the one or more tool state variables corresponding to a state of the second editing tools selected in the second instantiation of the printed product editor except the at least one additional editing tool; and
    synchronizing, by the one or more processors and in response to the updating, a state of the first editing tools to display, in the first instantiation, a selection of the same second editing tools excluding the at least one additional editing tool selected in the second instantiation.

2. The computer-implemented method of claim 1, wherein the synchronizing includes:
    detecting that the state of the first editing tools of the first instantiation of the printed product editor is different than the state of the second editing tools selected in the second instantiation of the printed product editor; and
    synchronizing the state of the first editing tools of the first instantiation of the printed product editor based on the updated one or more tool state variables corresponding to the state of the second editing tools selected in the second instantiation of the printed product editor in response to the detecting.

3. The computer-implemented method of claim 1, further comprising:
    storing, in the database, one or more content state variables corresponding to one or more design elements included in a product design configured to be manipulated by the printed product editor;
    updating, in the database, the one or more content state variables corresponding to a state of design elements selected in the second instantiation of the printed product editor; and
    synchronizing a state of design elements of the first instantiation of the printed product editor in response to the updating.

4. The computer-implemented method of claim 3, further comprising:
    updating, in the database, at least one of the one or more tool state variables corresponding to the state of the first editing tools or the one or more content state variables corresponding to the state of design elements of the first instantiation of the printed product editor; and
    synchronizing at least one of the state of the second editing tools or the state of design elements selected in the second instantiation of the printed product editor in response to updating the at least one of the one or more tool state variables corresponding to the state of the first editing tools or the one or more content state variables corresponding to the state of design elements of the first instantiation of the printed product editor.

5. The computer-implemented method of claim 1, further comprising:
    integrating at least one of a text session, a phone call session, or a video session with the collaborative communication session.

6. The computer-implemented method of claim 1, wherein the collaborative communication session is a web browser-based session.

7. The computer-implemented method of claim 1, wherein the request is transmitted by the first electronic device in response to a user input at the first instantiation of the printed product editor.

8. A server for co-editing a design for a printed product, the server comprising:
  a memory storing non-transitory computer executable instructions; and
  a computer processor interfacing with a user interface and the memory, wherein the computer processor is configured to execute the non-transitory computer executable instructions to:
    store, in a database, one or more tool state variables corresponding to editing tools included in a printed product editor for editing content included in the printed product;
    receive, from a first electronic device executing a first instantiation of the printed product editor including first editing tools, a request for a collaborative communication session with a second electronic device executing a second instantiation of the printed product editor including second editing tools;
    generate the collaborative communication session between the first electronic device and the second electronic device in response to the request, the collaborative communication session including a state of the second editing tools, wherein the second editing tools includes all of the first editing tools and at least one additional editing tool that is not included in the first instantiation of the printed product editor, and wherein the at least one additional editing tool displays a plurality of design options corresponding to a plurality of templates for the design for the printed product;
    selectively update, in the database, the one or more tool state variables corresponding to a state of the second editing tools selected in the second instantiation of the printed product editor except the at least one additional editing tool; and
    synchronize, in response to the updating, a state of the first editing tools to display, in the first instantiation, a selection of the same second editing tools excluding the at least one additional editing tool selected in the second instantiation.

9. The server of claim 8, wherein the computer processor, upon execution of the non-transitory computer executable instructions, is configured to synchronize the state of first editing tools by:
  detecting that the state of the first editing tools of the first instantiation of the printed product editor is different than the state of the second editing tools selected in the second instantiation of the printed product editor; and
  synchronizing the state of the first editing tools of the first instantiation of the printed product editor based on the updated one or more tool state variables corresponding to the state of the second editing tools selected in the second instantiation of the printed product editor in response to the detecting.

10. The server of claim 8, wherein the computer processor, upon execution of the non-transitory computer executable instructions, is further configured to:
  store, in the database, one or more content state variables corresponding to one or more design elements included in a product design configured to be manipulated by the printed product editor;
  update, in the database, the one or more content state variables corresponding to a state of design elements selected in the second instantiation of the printed product editor; and
  synchronize a state of design elements of the first instantiation of the printed product editor in response to the updating.

11. The server of claim 10, wherein the computer processor, upon execution of the non-transitory computer executable instructions, is further configured to:
  update, in the database, at least one of the one or more tool state variables corresponding to the state of the first editing tools or the one or more content state variables corresponding to the state of design elements of the first instantiation of the printed product editor; and
  synchronize at least one of the state of the second editing tools or the state of design elements selected in the second instantiation of the printed product editor in response to updating the at least one of the one or more tool state variables corresponding to the state of the first editing tools or the one or more content state variables corresponding to the state of design elements of the first instantiation of the printed product editor.

12. The server of claim 8, wherein the computer processor, upon execution of the non-transitory computer executable instructions, is further configured to:
  integrate at least one of a text session, a phone call session, or a video session with the collaborative communication session.

13. The server of claim 8, wherein the collaborative communication session is a web browser-based session.

14. The server of claim 8, wherein the request is transmitted by the first electronic device in response to a user input at the first instantiation of the printed product editor.

15. A non-transitory computer-readable storage medium configured to store instructions, the instructions when executed by a processor causing the processor to perform operations comprising:
  storing, in a database, one or more tool state variables corresponding to editing tools included in a printed product editor for editing content included in the printed product;
  receiving, from a first electronic device executing a first instantiation of the printed product editor including first editing tools, a request for a collaborative communication session with a second electronic device executing a second instantiation of the printed product editor including second editing tools;
  generating the collaborative communication session between the first electronic device and the second electronic device in response to the request, the collaborative communication session including a state of the second editing tools, wherein the second editing tools includes all of the first editing tools and at least one additional editing tool that is not included in the first instantiation of the printed product editor, and wherein the at least one additional editing tool displays a plurality of design options corresponding to a plurality of templates for a design for the printed product;
  selectively updating, in the database, the one or more tool state variables corresponding to a state of the second editing tools selected in the second instantiation of the printed product editor except the at least one additional editing tool; and
  synchronizing, in response to the updating, a state of the first editing tools to display, in the first instantiation, a selection of the same second editing tools excluding the at least one additional editing tool selected in the second instantiation.

16. The non-transitory computer-readable storage medium of claim 15, the instructions when executed by the first processor causing the processor to perform the synchronizing by:
    detecting that the state of the first editing tools of the first instantiation of the printed product editor is different than the state of the second editing tools selected in the second instantiation of the printed product editor; and
    synchronizing the state of the first editing tools of the first instantiation of the printed product editor based on the updated one or more tool state variables corresponding to the state of the second editing tools selected in the second instantiation of the printed product editor in response to the detecting.

17. The non-transitory computer-readable storage medium of claim 15, the instructions when executed by the processor further causing the processor to perform operations comprising:
    storing, in the database, one or more content state variables corresponding to one or more design elements included in a product design configured to be manipulated by the printed product editor;
    updating, in the database, the one or more content state variables corresponding to a state of design elements selected in the second instantiation of the printed product editor; and
    synchronizing a state of design elements of the first instantiation of the printed product editor in response to the updating.

18. The non-transitory computer-readable storage medium of claim 17, the instructions when executed by the processor further causing the processor to perform operations comprising:
    updating, in the database, at least one of the one or more tool state variables corresponding to the state of the first editing tools or the one or more content state variables corresponding to the state of design elements of the first instantiation of the printed product editor; and
    synchronizing at least one of the state of the second editing tools or the state of design elements selected in the second instantiation of the printed product editor in response to updating the at least one of the one or more tool state variables corresponding to the state of the first editing tools or the one or more content state variables corresponding to the state of design elements of the first instantiation of the printed product editor.

* * * * *